Jan. 27, 1931.　　　H. M. KIRTON　　　1,790,427
LOCKING DEVICE FOR THE STEERING MECHANISM OF AUTOMOBILES
Filed Jan. 11, 1928
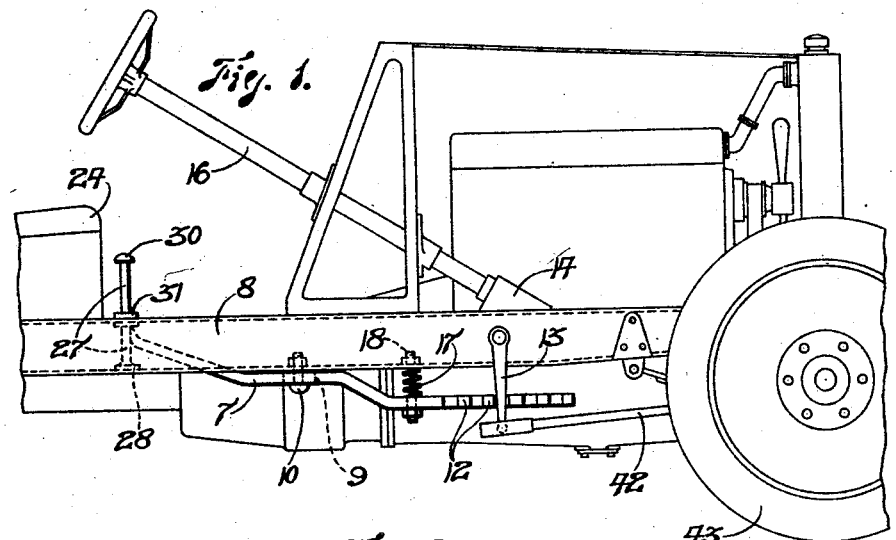
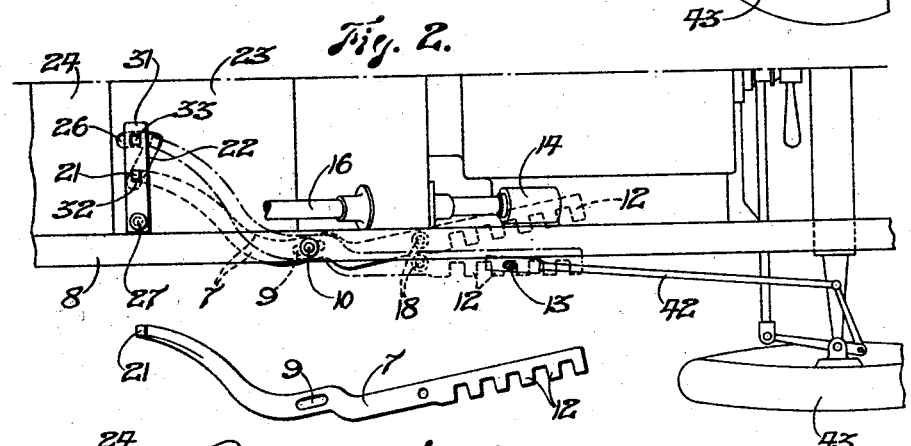
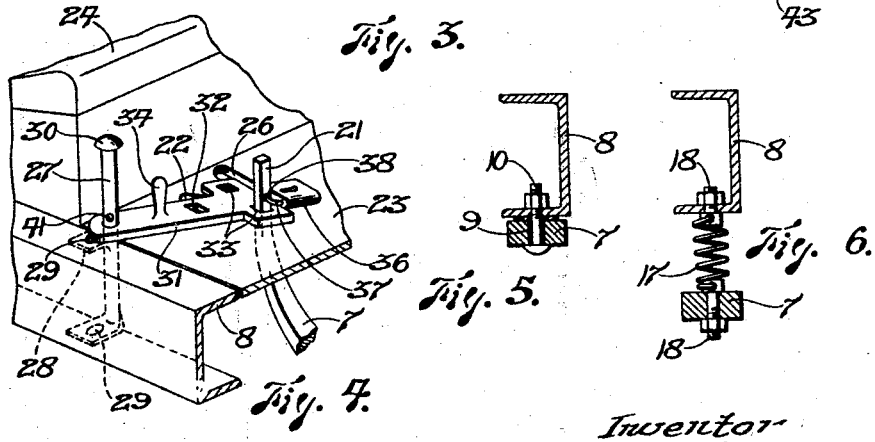
Inventor
H. M. Kirton
By
Atty.

Patented Jan. 27, 1931

1,790,427

UNITED STATES PATENT OFFICE

HERBERT MILBURN KIRTON, OF HAWKSBURN, MELBOURNE, VICTORIA, AUSTRALIA

LOCKING DEVICE FOR THE STEERING MECHANISM OF AUTOMOBILES

Application filed January 11, 1928. Serial No. 245,999.

This invention relates to locking devices for association with the steering mechanism of automobiles for the purpose of preventing, or at least minimizing theft or unauthorized use of the vehicles.

One of the objects of the present invention is to provide an improved locking device for association with automobile steering mechanism, the device being simple and inexpensive to construct and install, having few parts, none of which are liable to derangement, being readily operable from the driver's seat, and reliable and efficient in action.

More specifically an object of the present invention is to provide a simple locking device for association with an element of the steering connections which extend between the steering gear at the lower end of the steering column and the front wheels of an automobile, whereby the steering mechanism may be readily and effectively locked against operation at the will of the driver.

In its preferred form the invention comprises a locking bar which is pivoted or otherwise suitably attached to a suitable portion or member of the vehicle chassis. One end of this bar is preferably provided with teeth or projections capable of engaging the usual arm depending from the steering gear at the bottom of the steering column, and the other end may be fitted with an operating element conveniently located to the driver's seat, whereby the locking bar may be readily manipulated to thereby engage the toothed end portion thereof with the aforesaid steering arm. Suitable locking means are associated with the operating element of the locking bar whereby the latter may be securely held in an operative position.

Referring to the drawings which form part of this specification:—

Figure 1 is a fragmentary side elevation of an automobile showing the improved locking device operatively applied to the steering mechanism thereof.

Figure 2 is a part plan of Figure 1, the locking bar being shown in an operative position by dot and dash lines and in an inoperative position by dotted lines.

Figure 3 is a plan of the locking bar.

Figure 4 is a perspective view showing the locking bar and associated locking means in a position to prevent operation of the steering mechanism.

Figure 5 is a detail view showing one mode of mounting the locking bar.

Figure 6 is a detail view showing a flexible keeper or support for the locking bar.

In the drawings the numeral 7 is employed to indicate the locking bar which is constructed of suitable metal such, for instance, as vanadium steel. This locking bar is preferably pivotally attached, at a point intermediately of its length, to the side frame member 8 at the same side of the vehicle as the steering column 16.

In order to connect the locking bar 7 to the chassis frame 8, the bar may be provided with a longitudinally elongated slot 9 through which is passed a pivot pin or bolt 10. This form of connection permits the locking bar to be moved longitudinally, in addition to being swung about the pivot pin or bolt 10 for a purpose which will be hereinafter apparent.

The front end portion of the locking bar is provided with a series of longitudinally spaced teeth or projections 12 capable of engaging the usual rocker arm 13 which depends from the steering gear 14 located at the lower end of the steering column 16.

If desired, a flexible keeper, such as spring 17 as seen more clearly in Figure 6 may be provided to afford additional support for the locking bar without impeding its various movements. This spring may be attached at one end to the frame member 8 and at its other end to the locking bar, by means of suitable screws 18 or the like.

Rearwardly of the pivotal connection 9, 10, the locking bar may be bent inwardly, transversely and upwards and it is provided at its rear end with a handle or operating element 21 which projects upwardly through a slot or opening 22 formed in the floor board 23 in front of the driver's seat 24, as seen in Figures 2 and 4. This slot 22 is of suitable dimensions to permit the required swinging motions of the operating element, and an additional slot 26 may be formed in the flooring to permit endwise movement of the handle 21 and the locking bar 7.

Any suitable form of locking means may be associated with the locking bar. In the drawings such locking means includes a rod 27 which may be provided with outstanding lugs 28 attached by bolts or rivets 29 to the respective frame member 8 of the chassis. This rod also projects upwardly through the flooring 23 in front of the driver's seat and may be provided at its upper end with an enlarged head 30. A link member 31 may be provided to slide vertically along the upper portion of this upstanding rod, the head 30 of the latter preventing the link from being removed from the rod. This link member is provided at longitudinally spaced intervals with apertures 32, 33 for accommodating the locking bar handle 21. The link member may also be fitted with a handle 34.

When the locking bar 7 is in an inoperative position, as indicated by dotted lines in Figure 2, the handle or operating element 21, projects through an aperture 32 intermediately of the length of the link member, as seen in Figure 2, and the toothed front portion 12 of the locking bar is swung clear of the rocker arm 13 of the steering gear. The locking bar 7 may be normally held in an inoperative position by means of a padlock 36, the locking arm 37 of which is passed through an opening 38 in the handle 21, in a position above the aforesaid link member 31. It will thus be evident that the locking bar cannot be swung about its pivotal connection to bring the toothed front end 12 thereof into engagement with the rocker arm 13 of the steering gear.

To bring the device into operation the padlock 36 is detached from the handle and the link member 31 is raised along the upstanding rod 27 until it is freed from the upper end of the handle 21 which is then moved away from the rod along the slot 22, thereby causing the toothed end portion 12 of the locking bar to move towards the steering arm 13. When this arm 13 is engaged by the teeth 12, the said link member 31 is again placed over the handle 21 of the locking bar and pressed downwardly around the handle and the upstanding rod as seen more clearly in Figure 4. The padlock 36 is then applied to the locking bar handle to hold the bar in its adjusted position. An additional padlock may also be utilized to pass through a hole 41 in the upstanding rod 27 at a point immediately above the link member 31, thus increasing the security of the lock.

By forming the toothed front end portion 12 of the locking bar of sufficient length and providing for the longitudinal adjustment of said bar, it will be evident that the steering arm 13 may be engaged by the locking bar and securely held in position irrespective of the position of the steering mechanism.

If desired, the link member 31 may be increased in width at its outer end to thereby permit a number of transversely spaced apertures 33 to be formed therethrough. These apertures may accommodate the handle 21 of the locking bar according to its various longitudinally adjusted positions.

While I have described the locking bar 7 as cooperating with the steering arm 13 depending from the steering gear, it will be evident that it may, if desired, be operatively associated with an arm or projection (not shown) outstanding from the steering rod 42 which extends between the rocker arm 13 and the usual swivel mounting for the adjacent front wheel, 43.

It will also be evident that the locking bar may be bent or turned, between its pivotal connection 9, 10 and the handle 21, in any desirable manner that may be necessary to avoid fouling of any parts of the vehicle.

Having now described my invention what I claim as new and desire to secure by Letters Patent is:—

1. A locking device for the steering mechanism of automobiles, comprising in combination, a locking bar, means for pivotally mounting said bar, at a point intermediately of its length, upon an automobile chassis so that the bar extends longitudinally thereof, the front end portion of said locking bar being provided with longitudinally spaced teeth projections, said locking bar being provided at its rear with an operating handle which upstands in front of the driver's seat, whereby said bar may be swung about its pivot to bring the toothed front end portion thereof into engagement with a member of the steering connections which extend between the steering gear at the lower end of the steering column and the front wheels of the vehicle, and means associated with said operating handle for locking said bar in an operative position.

2. A locking device for the steering mechanism of automobiles, comprising in combination, a locking bar, means for movably mounting said bar upon an automobile chassis, said bar being adapted to engage a movable member on the steering connections which extend between the steering gear at the lower end of the steering column and the front wheels of the vehicle an operating element whereby said bar may be moved into and out of engagement with said member of the steering connection and means for locking said bar in an operative position, said locking means comprising a link member which is anchored at one end and is provided at various points in its length with apertures through which the operating elements of the locking bar may be passed, and a padlock adapted to prevent unauthorized disengagement of said link member from said operating element.

3. A locking device for the steering mechanism of automobiles, comprising in combination, a locking bar means for movably mounting said bar upon an automobile chassis, said bar being adapted to engage a movable member on the steering connections which extend between the steering gear at the lower end of the steering column and the front wheels of the vehicle, an operating element whereby said bar may be moved into and out of engagement with said member of the steering connection, and means for locking said bar in an operative position, said locking means comprising a rod or anchoring post which upstands in front of the driver's seat, a link member pivotally connected at one end to said rod or post and provided at various points in its length with apertures through which the operating element of the locking bar may be passed, and a padlock adapted to prevent unauthorized disengagement of said link from said operating element.

4. A locking device for the steering mechanism of automobiles, comprising in combination, a locking bar, means for connecting said bar to a frame member of the automobile chassis whereby said bar may be swung to and fro in a direction laterally of the vehicle and is also capable of longitudinal movement, said bar being provided adjacent its front end with a series of longitudinally spaced teeth or projections capable of engaging an arm depending from the steering gear at the lower end of the steering column, the rear end of said bar being provided with an operating handle located conveniently to the driver's seat, and means for locking said bar in an operative position.

5. In a locking device for application to an automobile, a locking bar formed with a slot intermediate of its length for pivotal attachment to the chassis of the vehicle beneath one of the side frames thereof whereby to provide lengthwise adjustment of the bar, said bar being provided adjacent one end with means for engaging a movable member of the steering connections which extend between the steering gear at the lower end of the steering column and the front wheels of the vehicle, and at its other end with an operating element or handle.

6. A locking device for the steering mechanism of automobiles, comprising in combination, a locking bar having its rear end extending upwardly, means for universally mounting said bar upon an automobile chassis including a slot and pin, whereby said bar is adapted to engage a movable member of the steering connections in any one of a plurality of positions of said member, and a spring engaging the locking bar to normally elevate the rear extended end and means associated with the rear extended end for locking the bar in an operative position.

7. A locking device for the steering mechanism of automobiles, comprising in combination, a locking bar having its rear end extended upwardly, means for universally mounting said bar upon an automobile chassis including a slot and pin, whereby said bar is adapted to engage a movable member of the steering connections in any one of a plurality of positions of said member, a spring engaging the locking bar to normally elevate the rear extended end, an operating element associated with the rear extended end of the bar, whereby said bar may be moved into and out of engagement with the said member, and means for locking said bar in inoperative or operative position.

8. A locking device for the steering mechanism of automobiles, comprising in combination, a locking bar, means for movably mounting said bar upon an automobile chassis including a slot and pin, a series of teeth formed at the end of said bar, the said teeth engaging a movable element of the steering connections in any one of a plurality of positions, and means at the end of the bar for locking said bar in an operative position, including a locking plate and an opening through which the end of the bar passes.

In testimony whereof I affix my signature.

H. M. KIRTON.